US012146456B2

(12) United States Patent
Nishimura et al.

(10) Patent No.: US 12,146,456 B2
(45) Date of Patent: Nov. 19, 2024

(54) CONTROL DEVICE FOR FUEL VAPOR TREATMENT APPARATUS

(71) Applicant: TOYOTA JIDOSHA KABUSHIKI KAISHA, Toyota (JP)

(72) Inventors: Yuusaku Nishimura, Toyota (JP); Hideki Miyahara, Miyoshi (JP); Keita Fukui, Fujinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/465,457

(22) Filed: Sep. 12, 2023

(65) Prior Publication Data

US 2024/0167437 A1 May 23, 2024

(30) Foreign Application Priority Data

Nov. 18, 2022 (JP) ................................ 2022-184953

(51) Int. Cl.
*F02M 25/08* (2006.01)

(52) U.S. Cl.
CPC .... *F02M 25/0809* (2013.01); *F02M 25/0836* (2013.01); *F02M 25/0872* (2013.01)

(58) Field of Classification Search
CPC . F02M 25/0836; F02M 25/0809; F02M 25/08
USPC .................................................. 123/519, 520
See application file for complete search history.

(56) References Cited

U.S. PATENT DOCUMENTS

| | | | | |
|---|---|---|---|---|
| 6,550,339 | B1 * | 4/2003 | Toyoda | G01L 19/146 73/716 |
| 2012/0186333 | A1 | 7/2012 | Nishimura et al. | |
| 2017/0037806 | A1 * | 2/2017 | Dudar | F02M 25/0809 |
| 2020/0141360 | A1 * | 5/2020 | Takagi | F02M 25/0809 |

FOREIGN PATENT DOCUMENTS

| | | |
|---|---|---|
| JP | 2012-149592 A | 8/2012 |

* cited by examiner

*Primary Examiner* — George C Jin
*Assistant Examiner* — Teuta B Holbrook
(74) *Attorney, Agent, or Firm* — SoraIP, Inc.

(57) ABSTRACT

The fuel vapor treatment apparatus includes a fuel tank, a canister, a vapor passage, a purge passage, a sealing valve, a purge valve, an outside air introduction passage, a switching valve, and a differential pressure detector. A processing device of the fuel vapor treatment apparatus includes a purge control unit and a purge diagnosis unit. The purge control unit performs a purge process by opening the purge valve in a state where the purge valve and the sealing valve are closed and the switching valve is opened. The purge diagnosis unit diagnoses whether or not the purge process is normal based on the amount of change in the differential pressure between before and after the opening of the purge valve.

5 Claims, 6 Drawing Sheets

CONTROL DEVICE FOR FUEL VAPOR TREATMENT APPARATUS

CROSS-REFERENCE TO RELATED APPLICATION

This application claims priority to Japanese Patent Application No. 2022-184953 filed on Nov. 18, 2022, incorporated herein by reference in its entirety.

BACKGROUND

1. Technical Field

The present disclosure relates to a control device for a fuel vapor treatment apparatus.

2. Description of Related Art

A technique is known in which a leak diagnosis between a fuel tank and a canister of a fuel vapor treatment apparatus is performed based on a tank internal pressure sensor (see, for example, Japanese Unexamined Patent Application Publication No. 2012-149592 (JP 2012-149592 A)).

SUMMARY

It is conceivable to perform a purge diagnosis for diagnosing whether a purge process is normally performed. In order to perform the purge diagnosis based on the above-described tank internal pressure sensor, it is necessary to perform the purge diagnosis by executing the purge process after the sealing valve is opened and the tank internal pressure become atmospheric pressure. Therefore, it may take time to start the purge process, and as a result, it may take time to start the purge diagnosis.

An object of the present disclosure is to provide a control device for a fuel vapor treatment apparatus capable of starting the purge diagnosis at an early stage.

In a control device for a fuel vapor treatment apparatus according to a first aspect of the present disclosure, the fuel vapor treatment apparatus includes a fuel tank, a canister, a vapor passage, a purge passage, a sealing valve, a purge valve, an outside air introduction passage, a switching valve, and a differential pressure detector. The fuel tank stores fuel of an internal combustion engine. The canister adsorbs evaporated fuel generated in the fuel tank. The vapor passage communicates the fuel tank and the canister. The purge passage communicates an intake passage of the internal combustion engine and the canister. The sealing valve opens and closes the vapor passage. The purge valve opens and closes the purge passage. The outside air introduction passage introduces outside air into the canister. The switching valve opens and closes the outside air introduction passage. The differential pressure detector detects differential pressure between pressure in the fuel tank and pressure in a passage between the sealing valve and the purge valve.

The control device includes:

- a purge control unit for executing a purge process; and
- a purge diagnosis unit for diagnosing whether the purge process is normal based on a change amount of the differential pressure before and after the purge valve is opened.

The purge control unit executes the purge process by opening the purge valve while the purge valve and the sealing valve are closed and the switching valve is opened.

The purge diagnosis unit may further close the switching valve during execution of the purge process.

The purge diagnosis unit may diagnose whether the purge process is normal based on the change amount of the differential pressure before and after the switching valve is closed.

The control device according to the first aspect of the present disclosure may further include:

- a first leak diagnosis unit for performing a leak diagnosis of the fuel tank based on the differential pressure while the purge valve and the sealing valve are closed and the switching valve is opened; and
- a second leak diagnosis unit for performing a leak diagnosis of the canister based on the differential pressure when the pressure in the fuel tank is within a normal range.

The second leak diagnosis unit may perform the leak diagnosis of the canister based on the differential pressure after the switching valve is closed, and the sealing valve is opened, and then the sealing valve is closed, and the switching valve is opened.

The second leak diagnosis unit may determine that the canister has leak abnormality when the differential pressure is substantially zero.

The differential pressure detector may include a diaphragm, a strain gauge for detecting strain of the diaphragm, a housing for holding the diaphragm and the strain gauge, and a communication passage connected to the housing.

The housing may partition a tank chamber and a back pressure chamber via the diaphragm. The tank chamber may communicate with the fuel tank.

The back pressure chamber may communicate with the communication passage.

The communication passage may communicate with a passage between the sealing valve and the purge valve.

According to the present disclosure, it is possible to provide the control device of the fuel vapor treatment apparatus capable of starting the purge diagnosis at an early stage.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of the Fuel Vapor Treatment Apparatus

Figure 1:
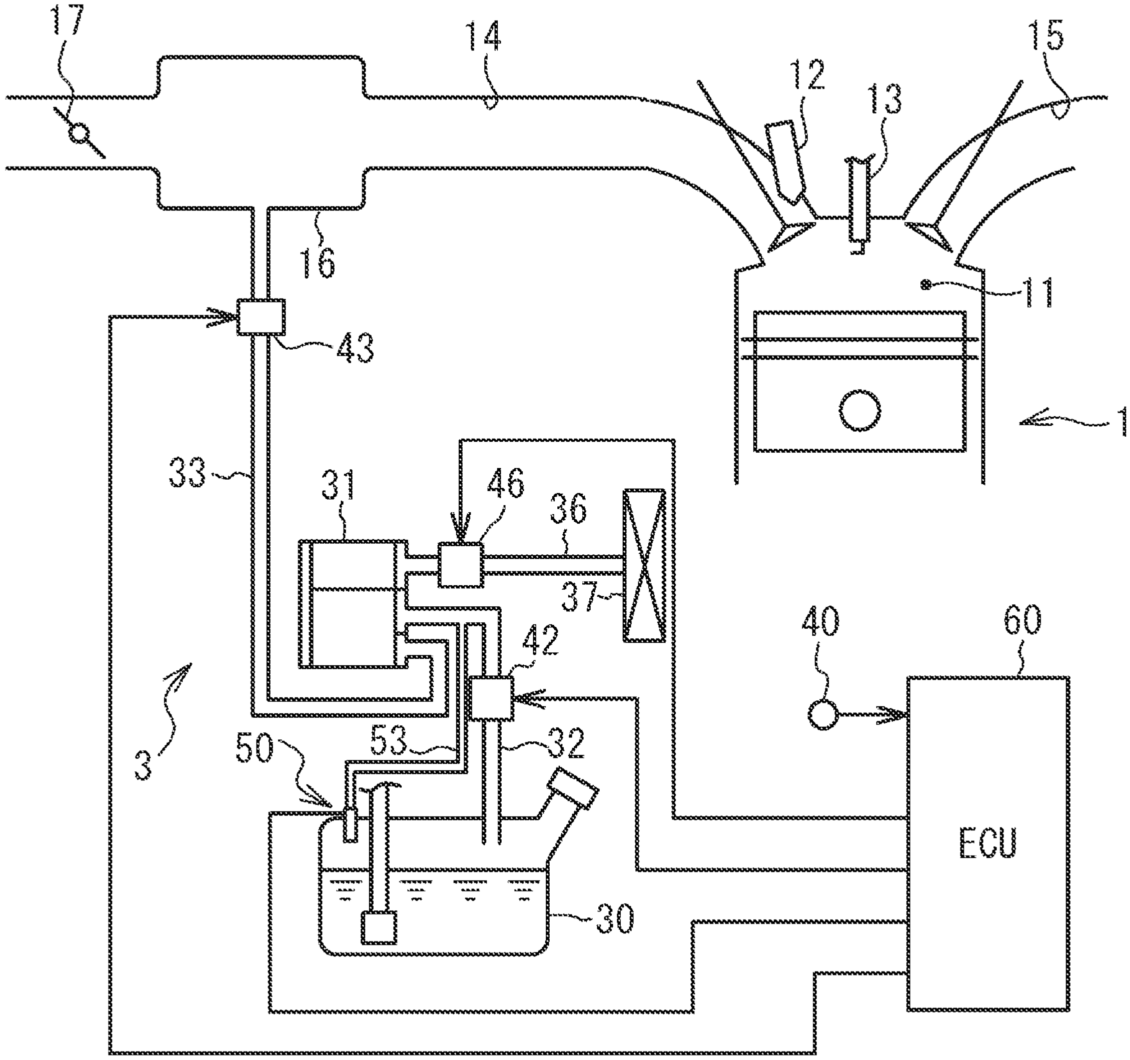
FIG. 1 is a schematic configuration diagram of a fuel vapor treatment apparatus applied to an engine.

FIG. 1 is a schematic configuration diagram of a fuel vapor treatment apparatus 3 applied to an engine 1. In the present embodiment, the engine 1 and the fuel vapor treatment apparatus 3 are mounted on a vehicle. The engine 1 is provided with a fuel injection valve 12 for injecting and supplying fuel to the combustion chamber 11, and an ignition plug 13 for igniting an air-fuel mixture that is a mixture of injected fuel and intake air. An intake passage 14 and an exhaust passage 15 are connected to the combustion chamber 11. A surge tank 16 constituting a part of the intake passage 14 is provided in the middle of the intake passage 14. A throttle valve 17 for metering an intake air amount is provided upstream of the intake air of the surge tank 16.

The fuel vapor treatment apparatus 3 includes a fuel tank 30 that stores fuel. The fuel in the fuel tank 30 is supplied to the fuel injection valve 12 via a fuel supply path. The fuel tank 30 is provided with a differential pressure detector 50 that detects a difference between a pressure in the fuel tank 30 (hereinafter, referred to as a tank internal pressure) and a pressure in a passage (hereinafter, referred to as a passage internal pressure) between a sealing valve 42 to be described later and a purge valve 43. The fuel vapor treatment apparatus 3 suppresses the vaporized fuel generated in the fuel tank 30 from being released to the atmosphere.

The fuel vapor treatment apparatus 3 is provided with a canister 31 that adsorbs the vaporized fuel generated in the fuel tank 30. The canister 31 and the fuel tank 30 communicate with each other through a vapor passage 32. A sealing valve 42 for opening and closing the vapor passage 32 is provided in the middle of the vapor passage 32. By opening the sealing valve 42, the evaporated fuel in the fuel tank 30 is once collected by the adsorbent provided in the canister 31.

The canister 31 and the surge tank 16 communicate with each other through a purge passage 33. A purge valve 43 for adjusting the flow rate of the evaporated fuel flowing through the purge passage 33 is provided in the middle of the purge passage 33. An outside air introduction passage 36 for introducing outside air into the canister 31 is connected to the canister 31. An air filter 37 is provided at an open end of the outside air introduction passage 36.

A switching valve 46 for opening and closing the outside air introduction passage 36 is provided in the middle of the outside air introduction passage 36. The switching valve 46 is a solenoid valve that opens the outside air introduction passage 36 in a non-energized state and closes the outside air introduction passage 36 in an energized state, which will be described in detail later. During engine operation, the switching valve 46 is maintained so as to open the outside air introduction passage 36, that is, in a state in which the outside air can be introduced into the canister 31.

The engine 1 and the fuel vapor treatment apparatus 3 are controlled by an Electronic Control Unit (ECU) 60. ECU 60 is an electronic control unit including an arithmetic processing unit that performs various arithmetic processing related to travel control of vehicles, and a memory that stores control programs and data. ECU 60 is connected with various sensors for detecting the operating condition of the engine 1 and the like, a differential pressure detector 50, an ignition switch 40 operated by a driver of the vehicle, and the like. ECU 60 executes various controls of the fuel vapor treatment apparatus 3 and the engine 1 based on the signals from the sensors and the switches. Further, as will be described in detail later, ECU 60 is an exemplary control device for a fuel vapor treatment apparatus, and functionally realizes a purge control unit, a purge diagnosis unit, a first leak diagnosis unit, and a second leak diagnosis unit.

When the predetermined condition is satisfied, ECU 60 performs a purge process of opening the purge valve 43 while the switching valve 46 is opened and the scaling valve 42 is closed during engine operation. As a result, the evaporated fuel is desorbed from the canister 31, and the desorbed evaporated fuel is introduced into the surge tank 16 via the purge passage 33, and is combusted in the combustion chamber 11.

Schematic Configuration of the Differential Pressure Detector

Figure 2:
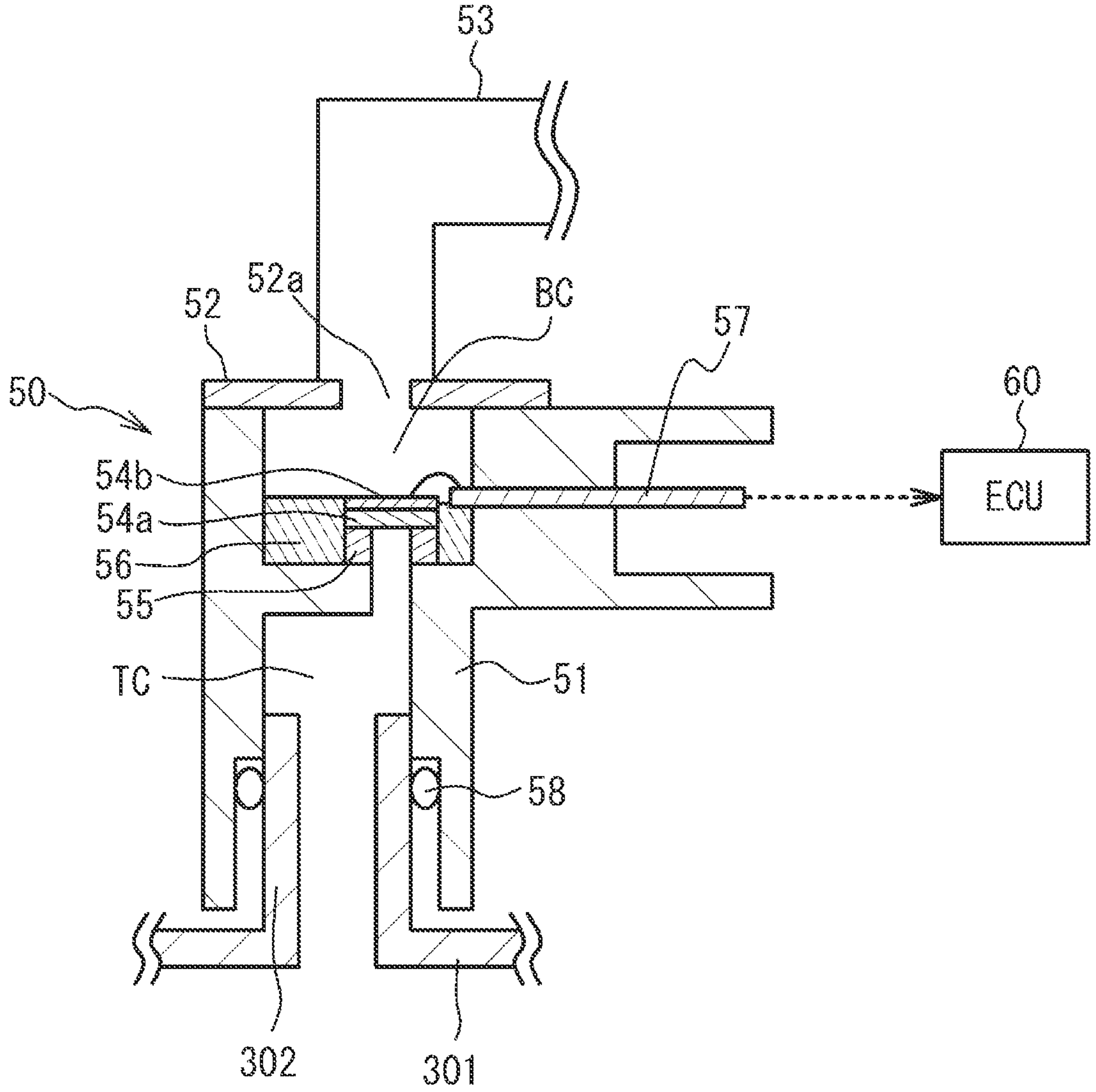
FIG. 2 is a schematic configuration diagram of a differential pressure detector.

FIG. 2 is a schematic configuration diagram of the differential pressure detector 50. The differential pressure detector 50 is attached to an attachment portion 302 protruding in a cylindrical shape from the outer wall surface 301 of the fuel tank 30. The differential pressure detector 50 includes a housing 51, a cover 52, a communication passage 53, a diaphragm **54*a*, a strain gage 54*b*, a pedestal 55, an adhesive 56, and a terminal 57. The housing 51 is formed in a substantially cylindrical shape, and a diaphragm 54*a* is held in the housing 51. One end of the housing 51 is attached to the attachment portion 302 via an O-ring 58. A cover 52 is attached to the other end of the housing 51. A communication hole 52*a* is formed in the cover 52. The communication passage 53 is connected to the housing 51 via a cover 52. The communication passage 53 communicates with the inside of the housing 51 via the communication hole 52*a* of the cover 52**.

A diaphragm **54*a* is held in the housing 51 via a cylindrical pedestal 55. The diaphragm 54*a* and the pedestal 55 are fixed to the inside of the housing 51 by an adhesive 56 at the periphery thereof. Accordingly, the inside of the housing 51 is partitioned into a tank chamber TC communicating with the inside of the fuel tank 30 via the diaphragm 54*a* and a back pressure chamber BC communicating with the communication passage 53. A strain gage 54*b* for detecting strain of the diaphragm 54*a* is attached to the diaphragm 54*a*. The strain gage 54*b* is connected to ECU 60 via a terminal 57. The diaphragm 54*a* is distorted in accordance with the differential pressure between the internal pressure of the tank chamber TC and the internal pressure of the back pressure chamber BC. When the strain gage 54*b* outputs the output value corresponding to the strain amount to ECU 60, ECU 60 can detect the differential pressure between the in-tank pressure and the in-passage pressure. ECU 60 detects a value obtained by subtracting the internal pressure of the back pressure chamber BC from the internal pressure of the tank chamber TC based on the output value from the strain gage 54*b*** as a differential pressure.

In the differential pressure detector 50, when the communication hole **52*a* is opened to the atmosphere without connecting the communication passage 53 to the cover 52, the differential pressure detector 50 can detect the in-tank pressure with respect to the atmospheric pressure. In other words, the differential pressure detector 50 can be manufactured by slightly changing the in-tank pressure sensor based on the atmospheric pressure. Therefore, an increase in the manufacturing cost of the differential pressure detector 50** is suppressed.

The communication passage 53 is connected to the vapor passage 32 between the sealing valve 42 and the canister 31, but is not limited thereto. The communication passage 53 may be connected to a passage between the sealing valve 42 and the purge valve 43. This passage includes a vapor passage 32 between the sealing valve 42 and the canister 31, a canister 31, and a purge passage 33 between the canister 31 and the purge valve 43. This is because, as will be described in detail later, in a state in which the sealing valve 42 is closed and the switching valve 46 is opened, the passage between the sealing valve 42 and the purge valve 43 communicates with each other, and the pressure in this portion is the same at any position.

Purge Diagnostic Control

Figure 3:
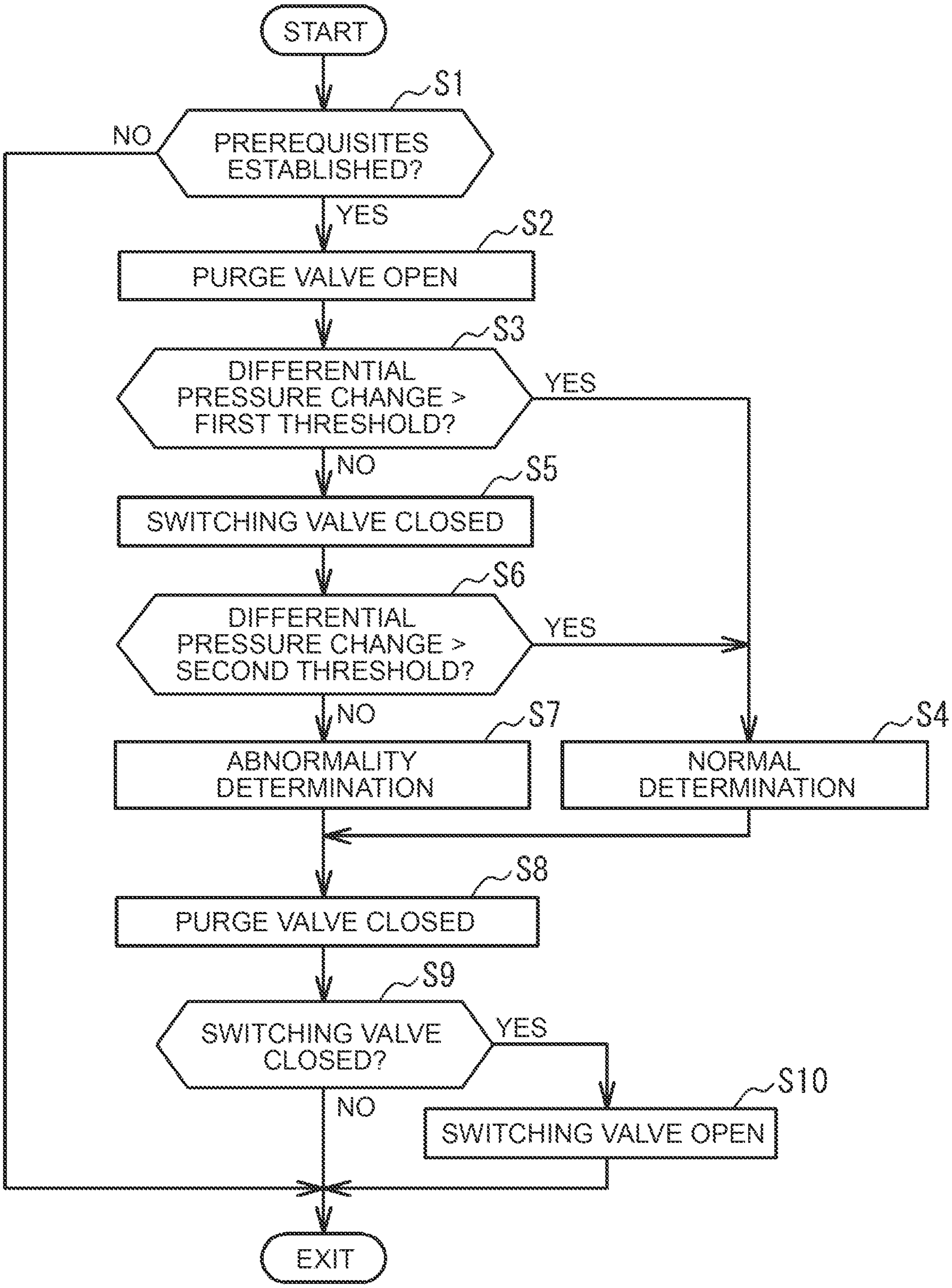
FIG. 3 is a flowchart illustrating purge diagnostic control.
Figure 4:
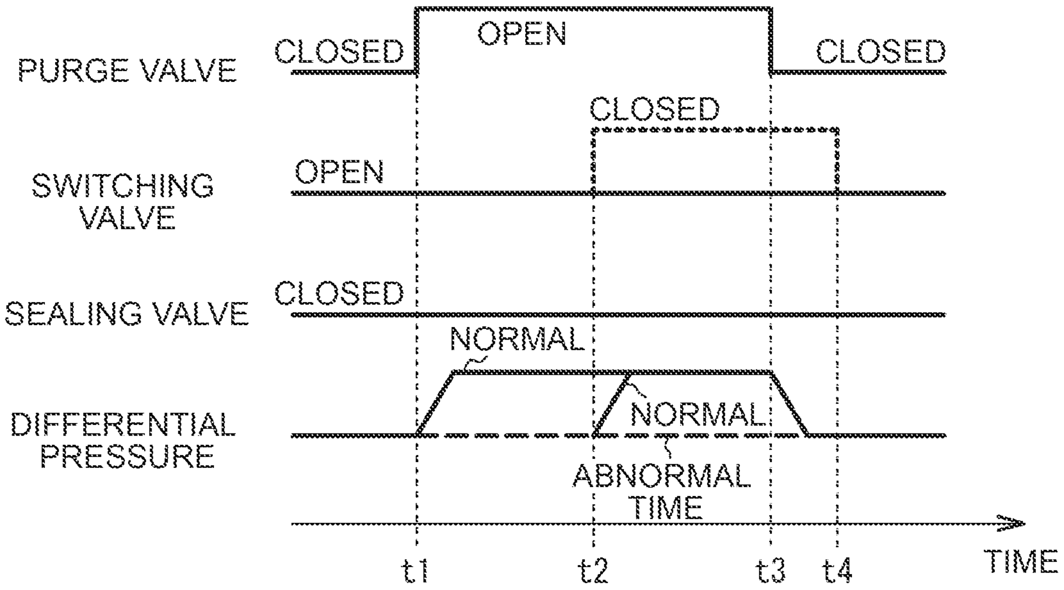
FIG. 4 is a timing chart illustrating purge diagnostic control.

FIG. 3 is a flowchart illustrating purge diagnostic control. FIG. 4 is a timing chart illustrating purge diagnosis control. FIG. 4 shows the transition of the open/close state of the purge valve 43, the switching valve 46, and the sealing valve 42, and the transition of the differential pressure detected by the differential pressure detector 50 in the case where the purge process is normal and the case where the purge process is abnormal. The purge diagnostic control is repeated continuously while the ignition is on. ECU 60 determines whether the precondition for the purging diagnostics is satisfied (S1). The prerequisite is, for example, a case where the engine 1 is being driven and there is a purge request. In this state, the sealing valve 42 and the purge valve 43 are closed, and the switching valve 46 is opened. If S1 is No, this control is terminated.

If S1 is Yes, ECU 60 opens the purge valve 43 (S2, time t1). As a result, the purge process is started. S1 and S2 are exemplary processes executed by the purge control unit.

Next. ECU 60 determines whether or not the variation of the differential pressure before and after the opening of the purge valve 43 is larger than the first thresholds (S3). If the purge process is normal, the opening of the purge valve 43 causes a negative pressure lower than the atmospheric pressure in the passage between the sealing valve 42 and the purge valve 43. As a result, as shown in FIG. 4, the differential pressure increases, and the amount of change in the differential pressure becomes equal to or greater than the first threshold value. On the other hand, in a case where there is some abnormality such as a case where the purge valve 43 is fixed in a closed state or a case where a jam occurs in the purge passage 33, the amount of change in the differential pressure is less than the first threshold value. If S3 is Yes, ECU 60 determines that the purging process is normal (S4). In this way, the purge processing can be started immediately after the purge request is received, and the purge diagnosis can be started.

When S3 is No, as described above, the purge valve 43 and the purge passage 33 may be abnormal, but it is conceivable that the variation of the differential pressure becomes less than the first threshold because these are normal and the flow rate of the evaporated fuel is small. For this reason, ECU 60 closes the switching valve 46 (S5, time t2), and determines whether or not the variation of the differential pressure between before and after the closing of the switching valve 46 has become equal to or greater than the second threshold value (S6). The second threshold value may be the same value as the first threshold value or may be a different value.

If the purge valve 43 and the purge passage 33 are normal by closing the switching valve 46 in a state in which the purge valve 43 is opened, the internal pressure of the passage is greatly reduced to the same negative pressure as in the surge tank 16. Therefore, the differential pressure increases, and the amount of change in the differential pressure becomes equal to or greater than the second threshold value. Therefore, when S6 is Yes, ECU 60 determines that the purging process is normal (S4). If S6 is No, ECU 60 determines that the purging process is abnormal (S7).

As described above, since the purging process is determined to be abnormal when No is performed in both S3 and S6, the accuracy of the abnormality determination is improved. S7 from S3 is an exemplary process executed by the purge diagnosis unit.

After determining the purge process as described above, ECU 60 closes the purge valve 43 (S8, time t3). As a result, the purge process ends. Next, ECU 60 determines whether or not the switching valve 46 is closed (S9). If S9 is Yes, ECU 60 opens the switching valve 46 (S10, time t4), and the control ends. If S9 is No, this control ends.

In the above-described purging diagnostic control, the accuracy of the anomaly determination is ensured by executing S5 and S6 when S3 is No. However, in a case where the diagnosis at an earlier stage than the accuracy of the abnormality determination is prioritized, the abnormality determination may be immediately performed in a case where the diagnosis is No in S3 without executing S5 and S6.

Leakage Diagnostic Control

Figure 5:
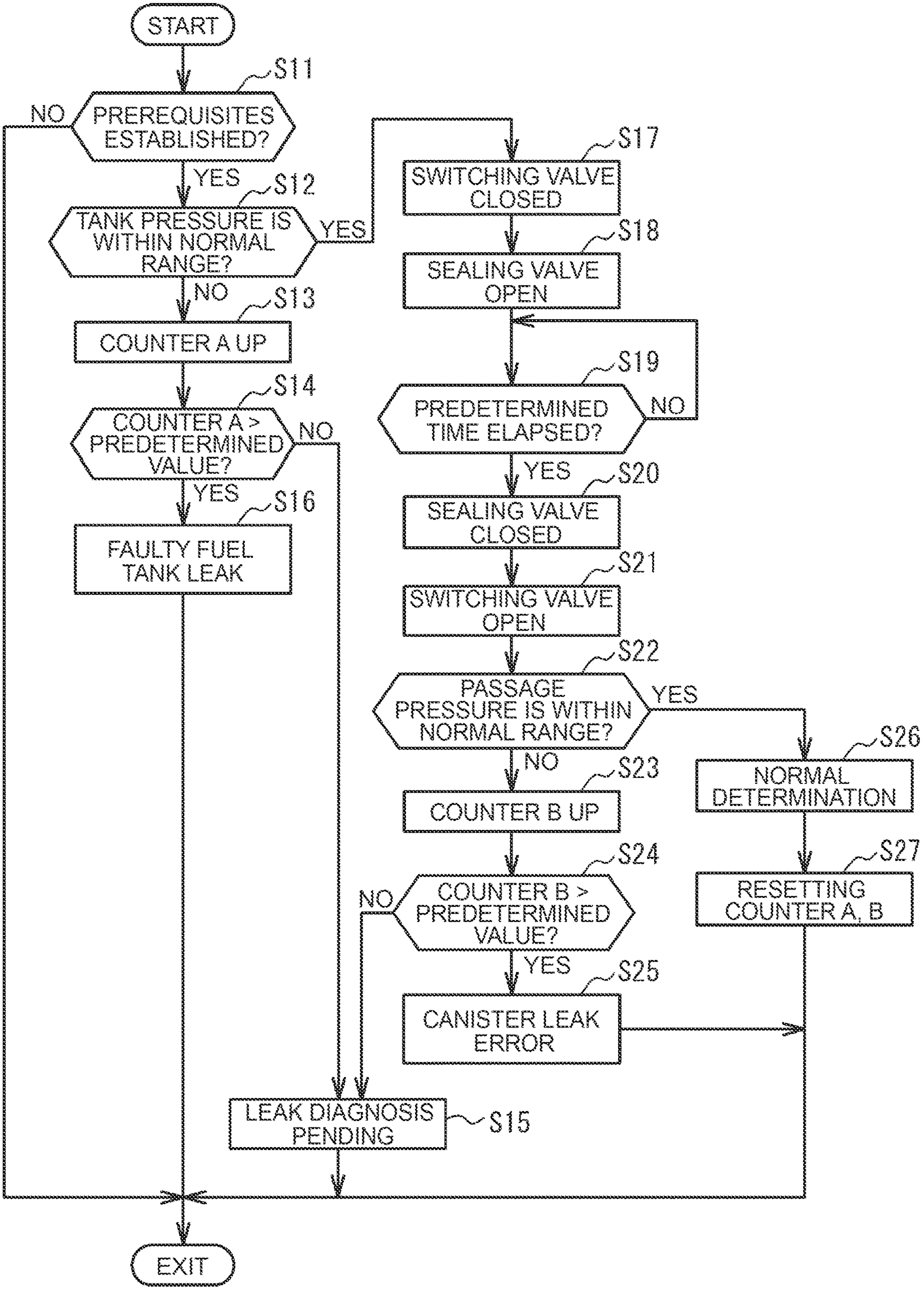
FIG. 5 is a flowchart illustrating a leak diagnosis control.

FIG. 5 is a flowchart illustrating a leak diagnosis control. The leak diagnosis control is repeated continuously while the ignition is on. ECU 60 determines whether or not the precondition for the leak diagnosis is satisfied (S11). The prerequisite is a condition for determining that the generation of the evaporated fuel in the fuel tank 30 is stable. For example, the following conditions are satisfied. The first condition is a period from when the engine 1 is stopped for a long time due to parking or the like and when the ignition is turned on, until immediately before the purge valve 43 is opened and the intake passage 14 is first purged. The second condition is a state in which several hours have elapsed after the ignition is turned off and the coolant temperature or the intake air temperature is equal to or lower than a predetermined temperature. The first condition or the second condition is set as a precondition. Note that a precondition may be a precondition in which the first condition and the second condition are used as a logical sum condition. In this state, the sealing valve 42 and the purge valve 43 are closed and the switching valve 46 is opened. If S11 is No, this control is terminated.

When S11 is Yes, a first leak diagnosis is performed to diagnose the presence or absence of a leak in the fuel-tank 30 as follows. ECU 60 determines whether the in-tank pressure is within the normal range based on the differential pressure detected by the differential pressure detector 50 (S12). Specifically, when the differential pressure is substantially zero, it is determined that the tank internal pressure is outside the normal range. When the differential pressure is a positive value or a negative value other than the above-described approximately zero, it is determined that the tank internal pressure is within the normal range. Here, since the switching valve 46 is opened, the pressure in the passage is atmospheric pressure, but when there is a leak in the fuel tank 30, the pressure in the tank is also atmospheric pressure, so that the differential pressure is substantially zero. When there is no leakage in the fuel tank 30, the pressure in the tank becomes higher or lower than the atmospheric pressure, and the differential pressure indicates a positive value or a negative value larger than zero. The reason why it is set to approximately zero is that the range in which the differential pressure can be regarded as zero in consideration of the tolerance of the differential pressure detector 50 is set to be outside the normal range.

If S12 is No, ECU 60 counts up counter-A (S13). Next, ECU 60 determines whether or not the counter-A is greater than a predetermined value (S14). If S14 is No, ECU 60 suspends leak diagnostics (S15). If S14 is Yes, ECU 60 determines that there is a leak error in the fuel-tank 30 (S16). As described above, the first leak diagnosis is performed. S14, S16 from S12 is an exemplary process executed by the first diagnostic unit.

Figure 6:
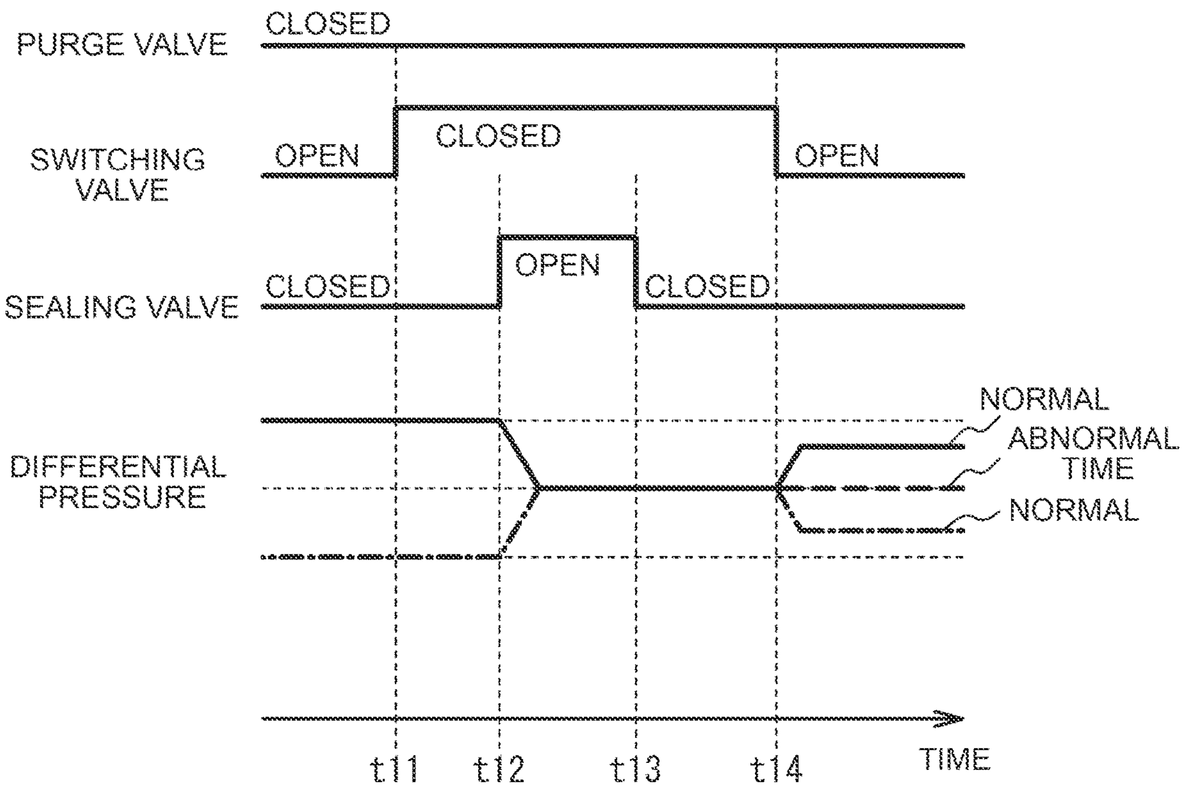
FIG. 6 is a timing chart illustrating the second leakage diagnosis.

When S12 is Yes, ECU 60 performs a second leak diagnosis for diagnosing the presence or absence of a leak in the canister 31. FIG. 6 is a timing chart illustrating the second leakage diagnosis. FIG. 6 shows the transition of the open/close state of the purge valve 43, the switching valve 46, and the sealing valve 42, and the transition of the differential pressure between the case where the canister 31 is normal and the case where the canister is abnormal. FIG. 6 illustrates a case where the second leak diagnosis is executed in a state where the differential pressure indicates a positive value, and a case where the second leak diagnosis is executed in a state where the differential pressure indicates a negative value. The positive value of the differential pressure means a state in which the tank internal pressure is higher than the atmospheric pressure, and the negative value of the differential pressure means a state in which the tank internal pressure is lower than the atmospheric pressure.

ECU 60 closes the switching valve 46 (S17, time t11) and then opens the scaling valve 42 (S18, time t12). As a result, the tank internal pressure is transmitted to the inside of the canister 31, the passage between the canister 31 and the switching valve 46 of the outside air introduction passage 36, and the passage between the canister 31 and the purge valve 43 of the purge passage 33.

Next, ECU 60 determines whether or not a predetermined period has elapsed since the sealing valve 42 was opened (S19). S19 process is executed again when No is performed by S19. As shown in FIG. 6, when the sealing valve 42 is opened, the differential pressure becomes substantially zero. That is, the predetermined time is set to a time required for the tank internal pressure and the passage internal pressure to be the same after the sealing valve 42 is opened.

When S19 is Yes, ECU 60 closes the sealing valve 42 (S20, time t13) and opens the switching valve 46 (S21, time t14). When there is no leakage or the like in the canister 31, the pressure in the passage becomes atmospheric pressure. Therefore, the difference between the tank internal pressure and the passage internal pressure increases, and the differential pressure also becomes a positive value or a negative value. On the other hand, for example, when there is leakage in the canister 31, when the sealing valve 42 is opened at the time t12 after the switching valve 46 is closed, both the tank internal pressure and the passage internal pressure become atmospheric pressure, and the differential pressure becomes substantially zero. When the switching valve 46 is subsequently opened at the time t14 after the closing of the sealing valve 42, the differential pressure is substantially zero.

Next, ECU 60 determines whether or not the in-passage pressure is within the normal range based on the differential pressure (S22). Specifically, when the differential pressure is approximately zero, it is determined that the pressure in the passage is outside the normal range. When the differential pressure is a positive value or a negative value other than the above-described approximately zero, it is determined that the pressure in the passage is within the normal range.

If S22 is No, ECU 60 counts up counter B (S23). Next, ECU 60 determines whether or not the counter-B is greater than a predetermined value (S24). If S24 is No, ECU 60 suspends the leak diagnostic (S15). If S24 is Yes, ECU 60 determines that the canister 31 has a leak error (S25).

If S22 is Yes, ECU 60 determines that the fuel-tank 30 and the canister 31 are leaking normally (S26) and resets the counters A and B (S27).

As described above, the leakage diagnosis control can be executed based on one differential pressure detector 50. Therefore, an increase in cost is suppressed as compared with a case where the leak diagnosis control is executed using a pressure sensor that detects, for example, the tank internal pressure and the canister internal pressure.

Although the embodiments of the present disclosure have been described in detail above, the present disclosure is not limited to such specific embodiments, and various modifications and changes can be made within the scope of the gist of the present disclosure described in the claims.

What is claimed is:

1. A control device for a fuel vapor treatment apparatus, the fuel vapor treatment apparatus including a fuel tank for storing fuel of an internal combustion engine, a canister for adsorbing evaporated fuel generated in the fuel tank, a vapor passage for communicating the fuel tank and the canister, a purge passage for communicating an intake passage of the internal combustion engine and the canister, a sealing valve for opening and closing the vapor passage, a purge valve for opening and closing the purge passage, an outside air introduction passage for introducing outside air into the canister, a switching valve for opening and closing the outside air introduction passage, and a differential pressure detector for detecting differential pressure between pressure in the fuel tank and pressure in a passage between the sealing valve and the purge valve, the control device comprising:

a purge control unit for executing a purge process, the purge control unit executing the purge process by opening the purge valve while the purge valve and the sealing valve are closed and the switching valve is opened; and a purge diagnosis unit for diagnosing whether the purge process is normal based on a change amount of the differential pressure before and after the purge valve is opened.

2. The control device according to claim 1, wherein:

the purge diagnosis unit further closes the switching valve during execution of the purge process; and the purge diagnosis unit diagnoses whether the purge process is normal based on the change amount of the differential pressure before and after the switching valve is closed.

3. The control device according to claim 1, further comprising:

a first leak diagnosis unit for performing a leak diagnosis of the fuel tank based on the differential pressure while the purge valve and the sealing valve are closed and the switching valve is opened; and a second leak diagnosis unit for performing a leak diagnosis of the canister based on the differential pressure when the pressure in the fuel tank is within a normal range, wherein the second leak diagnosis unit performs the leak diagnosis of the canister based on the differential pressure after the switching valve is closed, and the sealing valve is opened, and then the sealing valve is closed, and the switching valve is opened.

4. The control device according to claim 3, wherein the second leak diagnosis unit determines that the canister has leak abnormality when the differential pressure is substantially zero.

5. The control device according to claim 1, wherein:

the differential pressure detector includes a diaphragm, a strain gauge for detecting strain of the diaphragm, a housing for holding the diaphragm and the strain gauge, and a communication passage connected to the housing;

the housing partitions a tank chamber and a back pressure chamber via the diaphragm;

the tank chamber communicates with the fuel tank;

the back pressure chamber communicates with the communication passage; and the communication passage communicates with a passage between the sealing valve and the purge valve.

* * * * *